(12) United States Patent
Harada et al.

(10) Patent No.: US 8,059,859 B2
(45) Date of Patent: Nov. 15, 2011

(54) IMAGE PROCESSING APPARATUS AND METHOD OF CONTROLLING THE SAME

(75) Inventors: Koji Harada, Yokohama (JP); Masanori Yokoi, Kawasaki (JP); Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 12/128,174

(22) Filed: May 28, 2008

(65) Prior Publication Data

US 2008/0298634 A1    Dec. 4, 2008

(30) Foreign Application Priority Data

May 31, 2007  (JP) .................................. 2007-146098
May 20, 2008  (JP) .................................. 2008-131870

(51) Int. Cl.
*G06K 9/00*      (2006.01)
(52) U.S. Cl. ........ 382/100; 382/209; 382/218; 382/298; 345/698
(58) Field of Classification Search .................. None
See application file for complete search history.

(56) References Cited

U.S. PATENT DOCUMENTS

| | | | |
|---|---|---|---|
| 5,668,891 A | 9/1997 | Fan et al. | |
| 6,983,056 B1 | 1/2006 | Amano | |
| 7,065,237 B2 | 6/2006 | Murakami | |
| 7,209,572 B2 | 4/2007 | Iwamura et al. | |
| 7,260,238 B2 | 8/2007 | Iwamura et al. | |
| 7,269,274 B2 | 9/2007 | Iwamura et al. | |
| 7,320,138 B2 | 1/2008 | Wakao et al. | |
| 7,773,808 B2 | 8/2010 | Lim et al. | |
| 2002/0172398 A1* | 11/2002 | Hayashi | 382/100 |
| 2004/0057619 A1* | 3/2004 | Lim et al. | 382/182 |
| 2006/0209348 A1 | 9/2006 | Tabata | |
| 2006/0280515 A1* | 12/2006 | Harada | 399/80 |
| 2007/0025787 A1* | 2/2007 | Harada | 399/366 |
| 2007/0127771 A1 | 6/2007 | Kaneda et al. | |

OTHER PUBLICATIONS

Kineo Matsui, "Basics of a Digital Watermark," Morikita Publishing Co., Ltd., pp. 198-199, 1998 (ISBN:4-627-82551-X).

* cited by examiner

*Primary Examiner* — John Lee
(74) *Attorney, Agent, or Firm* — Fitzpatrick, Cella, Harper & Scinto

(57) ABSTRACT

To provide a technique of embedding information in a document image containing character strings, photos, and graphics, an image processing apparatus for inputting a document image and embedding watermark information by controlling the line spacing between character strings in the document image includes an input unit which inputs a document image as image data, an image reduction unit which generates reduced image data from the image data, a determination unit which determines reduced objects corresponding to character strings in the image data, a specifying unit which specifies the position of each character string in the image data based on the positions of the reduced objects in the reduced image data, and an embedding unit which embeds the watermark information in the image data by moving the positions of a plurality of specified character strings in the image data based on a preset line spacing correspondence relationship.

10 Claims, 16 Drawing Sheets

FIG. 4
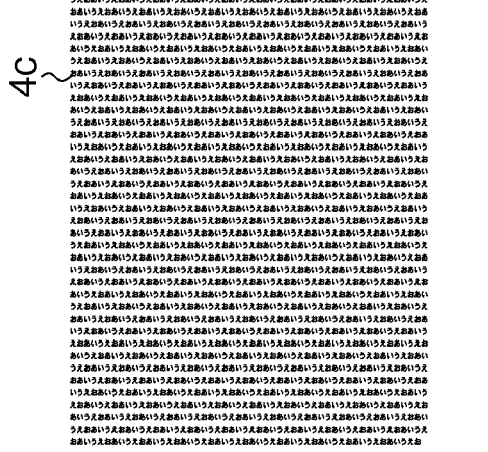
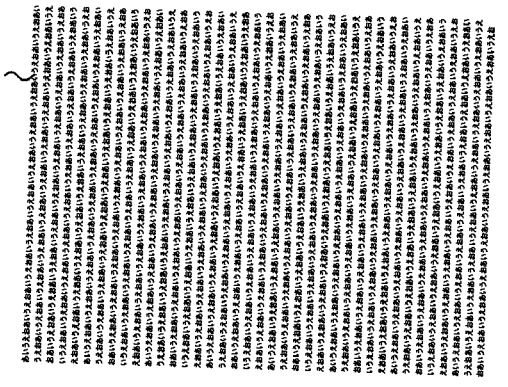
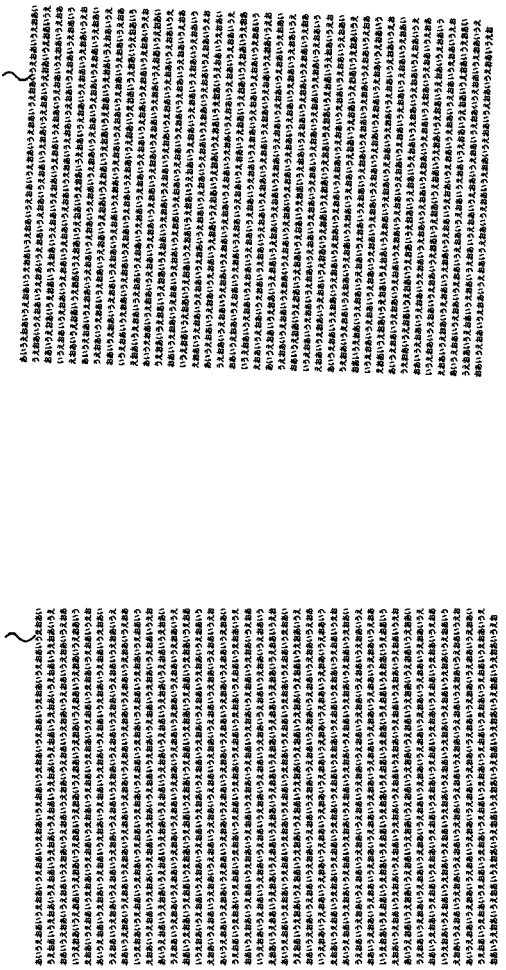

CONVERT HALFTONE PIXEL
INTO SIGNIFICANT PIXEL (BLACK)

IMAGE PROCESSING APPARATUS AND METHOD OF CONTROLLING THE SAME

BACKGROUND OF THE INVENTION

1. Field of the Invention

The present invention relates to an image processing technique of embedding watermark information in a document image based on the line spacing between the character strings in the document image.

2. Description of the Related Art

As a technique of adding information of, for example, copyright or copy control to a document image, a method described in Kineo Matsui, "Basics of a digital watermark", Morikita Publishing Co., Ltd. pp. 198-199, 1998 (ISBN:4-627-82551-X) is known, in which information is embedded using line spacing (to be referred to as a line spacing watermark hereinafter). FIG. 3 is a view showing the concept of a line spacing watermark. To extract embedded information from a document image using a line spacing watermark, first, the line spacing between the character strings in the document image is obtained. To obtain the line spacing, generally, a histogram is obtained by fully scanning the document image. The line spacing is derived from the histogram. Then, information is extracted in accordance with the derived line spacing and a rule used for embedding. To embed, e.g., binary information "0", line spacings U and D are set to U>D, as shown in FIG. 3. On the other hand, to embed binary information "1", the line spacings U and D are set to U<D.

However, the above-described method of extracting information embedded in a document image using a line spacing watermark has the following problems. To measure the line spacing, it is necessary to fully scan the document image and obtain a histogram. Hence, the information extraction process is time-consuming. In particular, when copy control information is embedded, the copy control information is extracted in a copying machine, whether copying is possible is determined based on the extracted information, and then, a copy process is performed. The series of processes of copying one document takes a lot of time.

Additionally, a method of embedding information in a document image containing character strings, photos, and graphics is not described in the prior art. A method of extracting information from a mixed document image is not described either.

SUMMARY OF THE INVENTION

According to one aspect of the present invention, an image processing apparatus for inputting a document image and embedding watermark information by controlling a line spacing between character strings in the document image, comprises: an input unit for inputting a document image as image data; an image reduction unit for, where W0 is the number of pixels in a first direction of the input document image and H0 is the number of pixels in a second direction perpendicular to the first direction, generating, from the input image data, reduced image data whose number of pixels in the first direction is W1 (1<W1<W0); a determination unit for determining reduced objects corresponding to character strings in the image data by scanning the reduced image data generated by the image reduction unit and comparing sizes of reduced objects in the reduced image data with a reference size designated in advance; a specifying unit for specifying a position of each character string in the image data on the basis of positions of the reduced objects in the reduced image data, which are determined by the determination unit as the reduced objects corresponding to the character strings; and an embedding unit for embedding the watermark information in the image data by moving positions of a plurality of character strings in the image data, which are specified by the specifying unit, on the basis of a preset line spacing correspondence relationship.

According to another aspect of the present invention, an image processing apparatus for inputting a document image and extracting embedded watermark information from a line spacing between character strings in the document image, comprises: an input unit for inputting a document image as image data; an image reduction unit for, where W0 is the number of pixels in a first direction of the input document image and H0 is the number of pixels in a second direction perpendicular to the first direction, generating, from the input image data, reduced image data whose number of pixels in the first direction is W1 (1<W1<W0); a determination unit for determining reduced objects corresponding to character strings in the image data by scanning the reduced image data generated by the image reduction unit and comparing sizes of reduced objects in the reduced image data with a reference size designated in advance; and a watermark information extraction unit for extracting the watermark information by scanning the reduced image data in the second direction and detecting a line spacing between the character strings of the reduced objects which are determined by the determination unit as the reduced objects corresponding to the character strings.

According to still another aspect of the present invention, a method of controlling an image processing apparatus for inputting a document image and embedding watermark information by controlling a line spacing between character strings in the document image, comprises the steps of: inputting a document image as image data; letting W0 be the number of pixels in a first direction of the input document image and H0 be the number of pixels in a second direction, generating, from the input image data, reduced image data whose number of pixels in the first direction is W1 (1<W1<W0); determining reduced objects corresponding to character strings in the image data by scanning the reduced image data generated in the image reducing step and comparing sizes of reduced objects in the reduced image data with a reference size designated in advance; specifying a position of each character string in the image data on the basis of positions of the reduced objects in the reduced image data, which are determined in the determining step as reduced objects corresponding to character strings; and embedding the watermark information in the image data by moving positions of a plurality of character strings in the image data, which are specified in the specifying step, on the basis of a preset line spacing correspondence relationship.

According to yet another aspect of the present invention, a method of controlling an image processing apparatus for inputting a document image and extracting embedded watermark information from a line spacing between character strings in the document image, comprises the steps of: inputting a document image as image data; letting W0 be the number of pixels in a first direction of the input document image and H0 be the number of pixels in a second direction perpendicular to the first direction, generating, from the input image data, reduced image data whose number of pixels in the first direction is W1 (1<W1<W0); determining reduced objects corresponding to character strings in the image data by scanning the reduced image data generated in the image reducing step and comparing sizes of reduced objects in the reduced image data with a reference size designated in advance; and extracting the watermark information by scanning the reduced image data in the second direction and detecting a line spacing between the character strings of the reduced objects which are determined in the determining step as the reduced objects corresponding to the character strings.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing binary image data containing a plurality of character strings;

DESCRIPTION OF THE EMBODIMENTS

Preferred embodiments of the present invention will now be described in detail with reference to the accompanying drawings. Note that the following embodiments are not intended to limit the scope of the invention, but are merely examples.

First Embodiment

An image processing apparatus according to the first embodiment of the present invention will be described below, which causes an image reading apparatus (scanner) to read a paper document and embeds watermark information in the read document image data. An image processing apparatus which extracts watermark information from document image data with the embedded watermark information will also be described.

<Watermark Information Embedding Algorithm (Line Spacing Correspondence Relationship)>

The first embodiment will be described assuming the following watermark information embedding algorithm. Any other algorithm is also applicable if it embeds watermark information based on the line spacing between character strings.

Figure 3:
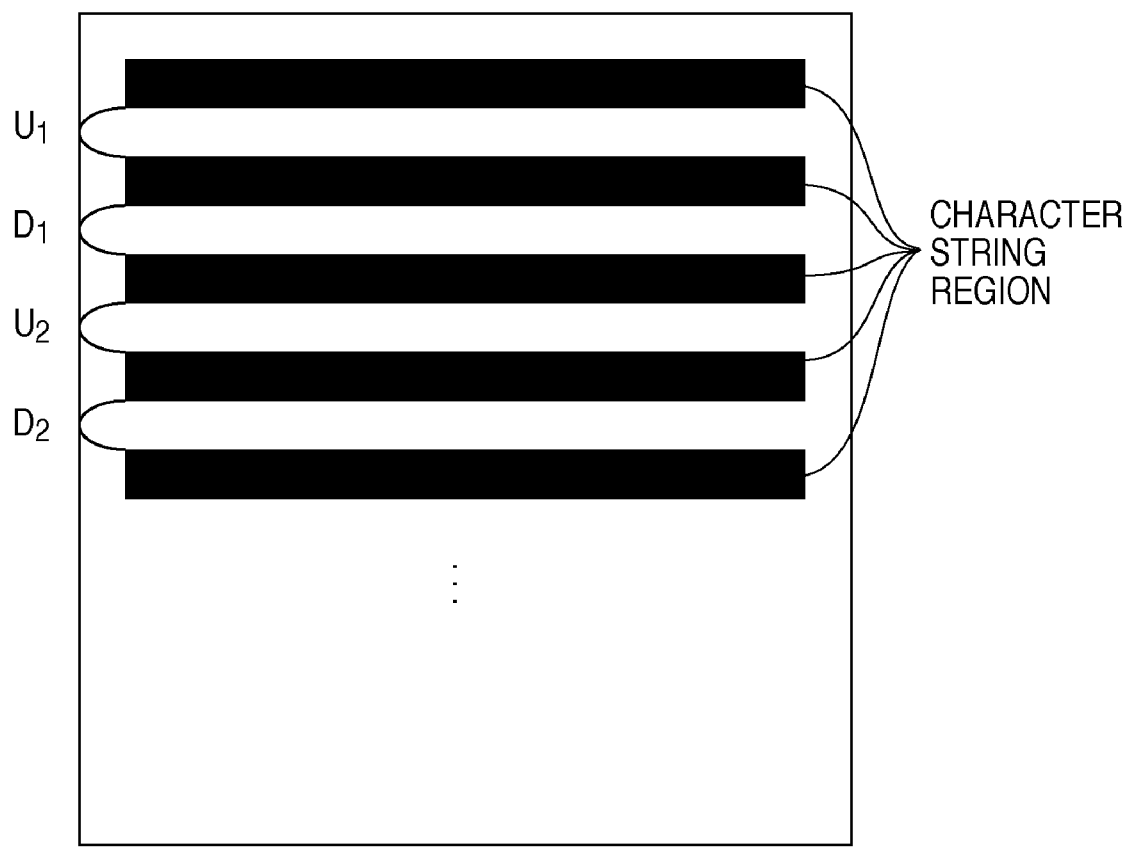
FIG. 3 is a view showing a document having embedded watermark information.

FIG. 3 is a view showing a document having embedded watermark information. In FIG. 3, black characters are printed on a white paper sheet. Binary information is embedded using two kinds of spacings (line spacings) U and D between a plurality of lines of character strings. More specifically, two continuous line spacings ($U_n$ and $D_n$: n is a natural number) are set in the following way.

To embed "0": $U_n > D_n$

To embed "1": $U_n < D_n$

<Arrangement of Information Embedding Apparatus>

Figure 1:
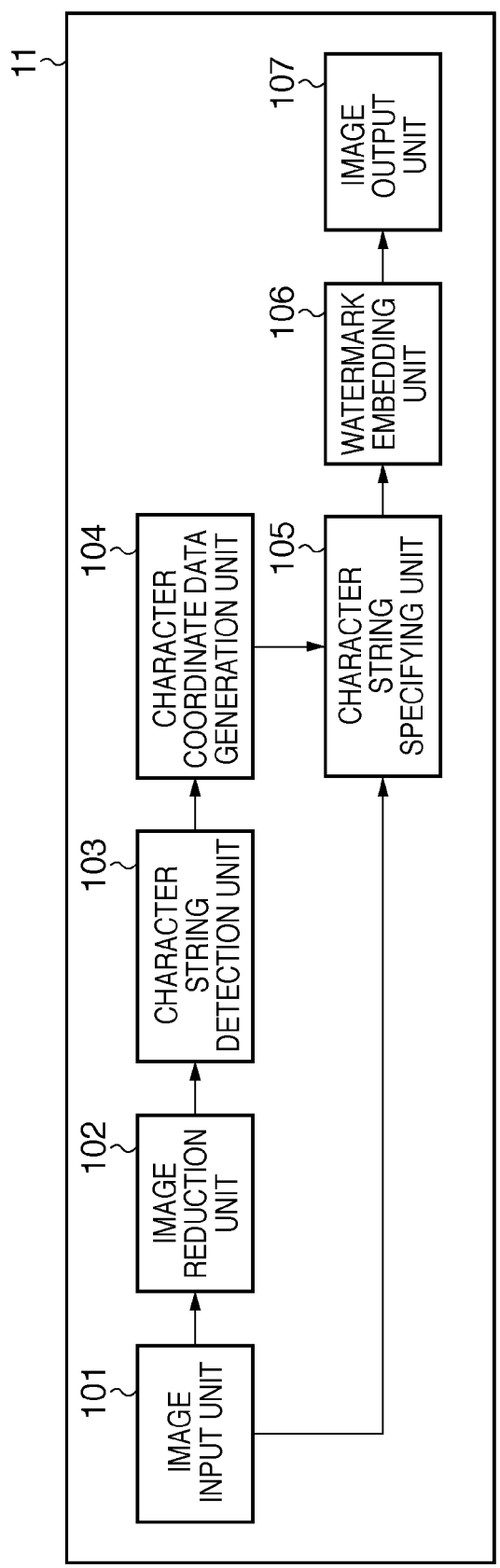
FIG. 1 is a block diagram showing the main functional arrangement of a watermark information embedding image processing apparatus 11 according to the first embodiment.

FIG. 1 is a block diagram showing the main functional arrangement of an information embedding image processing apparatus 11 according to the first embodiment. As shown in FIG. 1, the image processing apparatus 11 includes an image input unit 101, image reduction unit 102, character string detection unit 103, character coordinate data generation unit 104, character string specifying unit 105, line spacing watermark embedding unit 106, image output unit 107, control unit 110, and operation unit 111.

The image input unit 101 is a functional unit which inputs image data corresponding to a document image as a watermark information embedding target. More specifically, the image input unit 101 inputs image data, which is read and generated by an external scanner based on a paper document, via an external device connection interface such as a USB. The image input unit 101 may input image data via a network such as Ethernet®, as a matter of course.

The image reduction unit 102 is a functional unit which reduces the image data input by the image input unit 101 in a first direction (e.g., the horizontal direction of the image) and in a second direction (e.g., the vertical direction of the image) perpendicular to the first direction. When the input image data is bitmap (raster) data, generally, the above-described first and second directions match the array directions of pixels contained in the image data. As described above, the image reduction unit 102 is designed to reduce image data in the two directions perpendicular to each other. However, the image reduction unit 102 can be designed to reduce image data in only one direction, as will be described later.

The character string detection unit 103 is a functional unit which detects a character string object from a mixed document image reduced by the image reduction unit 102. That is, the input reduced image contains character strings, photo images, and graphics. The character string detection unit 103 detects only the character string portions.

The character coordinate data generation unit 104 is a functional unit which derives, from an object detected by the character string detection unit 103 as a character string object, coordinate data corresponding to the image data before reduction. More specifically, the character coordinate data generation unit 104 derives the coordinate data using the coordinates of the object in the reduced image and the reduction ratio of the image reduction unit 102.

The character string specifying unit 105 is a functional unit which specifies a character string in the image data before reduction based on the image data before reduction and the coordinate data derived by the character coordinate data generation unit 104.

The watermark embedding unit 106 is a functional unit which embeds, in the image data, binary information corresponding to watermark information. More specifically, the watermark embedding unit 106 adjusts the line spacing by moving a character string specified by the character string specifying unit 105. That is, the watermark embedding unit 106 sets a length (the number of continuous pixels) corresponding to each of the line spacings between a plurality of character strings based on binary (0 or 1) information that is watermark information. A watermark information embedding algorithm including the correspondence between a line spacing portion length and binary data and the amount of information (the number of bits) is set in an information extraction unit 903 in advance.

The image output unit 107 is a functional unit which outputs image data whose character string positions are adjusted by the watermark embedding unit 106. The data can be either output as image data or printed on a printing medium such as a paper sheet.

The control unit 110 is a functional unit which controls to make the above-described functional units cooperatively operate. The operation unit 111 is a functional unit which receives an instruction from a user.

<Operation of Information Embedding Apparatus>

An operation of causing the image processing apparatus 11 to extract watermark information from image data I will be described below in detail with reference to a flowchart.

Figure 2:
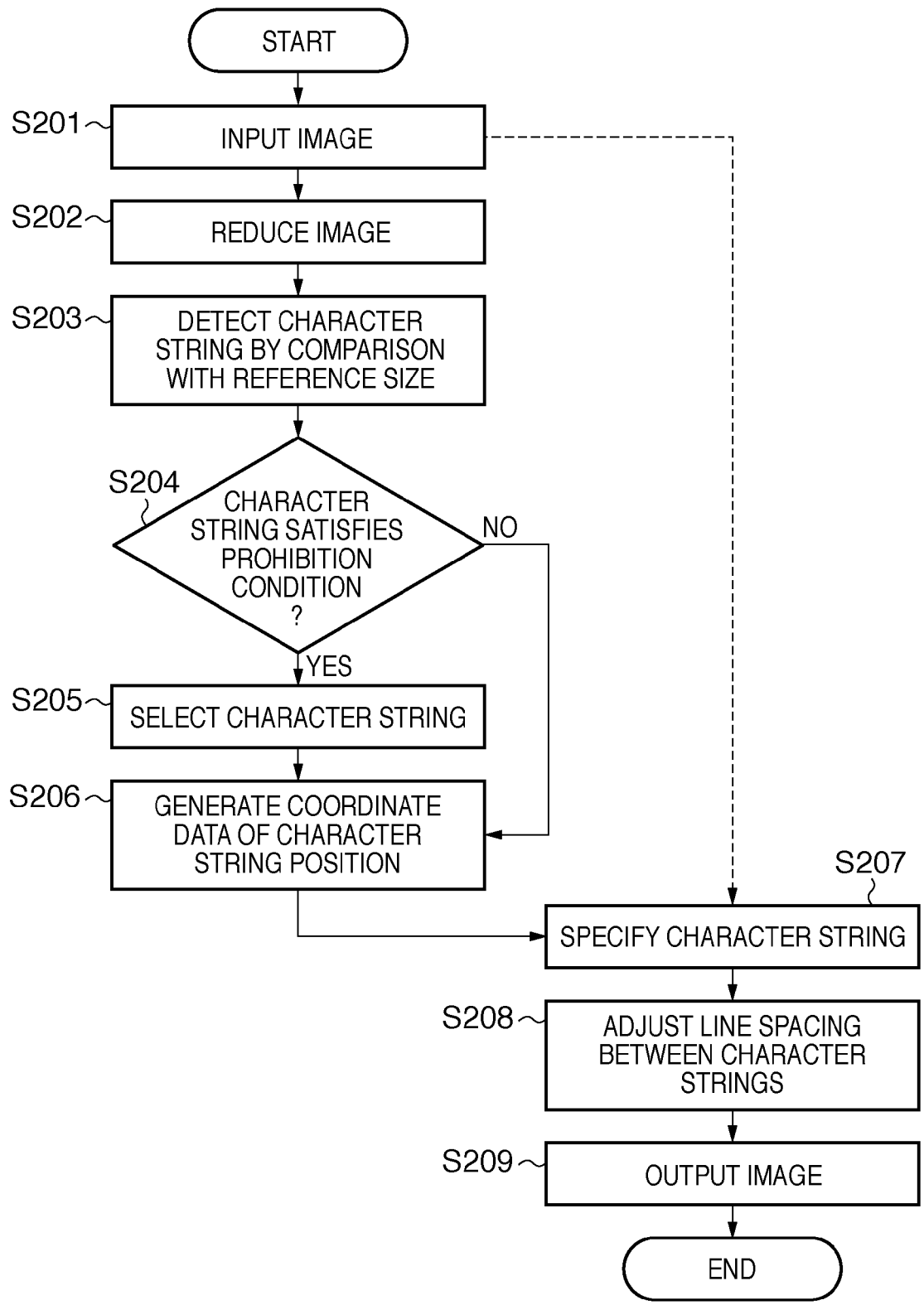
FIG. 2 is a flowchart illustrating the operation of the image processing apparatus 11.

FIG. 2 is a flowchart illustrating the operation of the information embedding image processing apparatus 11 according to the first embodiment. The following sequence is triggered by, for example, an image reading instruction input by the user via the operation unit 111.

In step S201, the image input unit 101 receives, from a scanner, the image data I corresponding to a document image as a watermark information embedding target and supplies the image data I to the image reduction unit 102. For example, a scanner having an optical sensor such as a charge-coupled device (CCD) reads the document and generates the image data I. Assume that the generated document image data I is a binary image including a black character portion and a white background portion of the paper document. A "black pixel" corresponding to a character portion will also be referred to as a "significant pixel" hereinafter. The number of horizontal pixels of the image data I is W0, and the number of vertical pixels is H0.

FIG. 4 is a view showing binary image data containing a plurality of character strings. Reference numeral 4*a* indicates image data which records a text document of horizontal writing in a correct direction. On the other hand, reference numerals 4*b* and 4*c* indicate tilted document images. When a scanner reads a paper document, as described above, image data like 4*b* or 4*c* may be input due to a shift with respect to the reference direction or a user's mistake in placing the paper document.

In step S202, the image reduction unit 102 reduces the image data I received from the image input unit 101 in the horizontal and vertical directions to generate reduced image data Ish in the horizontal direction and reduced image data Isv in the vertical direction. The image reduction unit 102 supplies the reduced image data Ish and Isv to the information extraction unit 103. The number of horizontal pixels of the reduced image data Ish is W1 (1<W1<W0), and the number of vertical pixels is H0. The number of horizontal pixels of the reduced image data Isv is W0, and the number of vertical pixels is H1 (1<H1<H0).

The reduced image data Ish is obtained by reduction in the horizontal direction without enlargement/reduction in the vertical direction. The reduced image data Isv is obtained by reduction in the vertical direction without enlargement/reduction in the horizontal direction. However, the reduced image data Ish need only have a higher reduction ratio in the horizontal direction than in the vertical direction. Hence, the image data can also be reduced or enlarged in the vertical direction as long as it is possible to measure the length between character string regions to be described later. This also applies to the reduced image data Isv.

Figure 5:
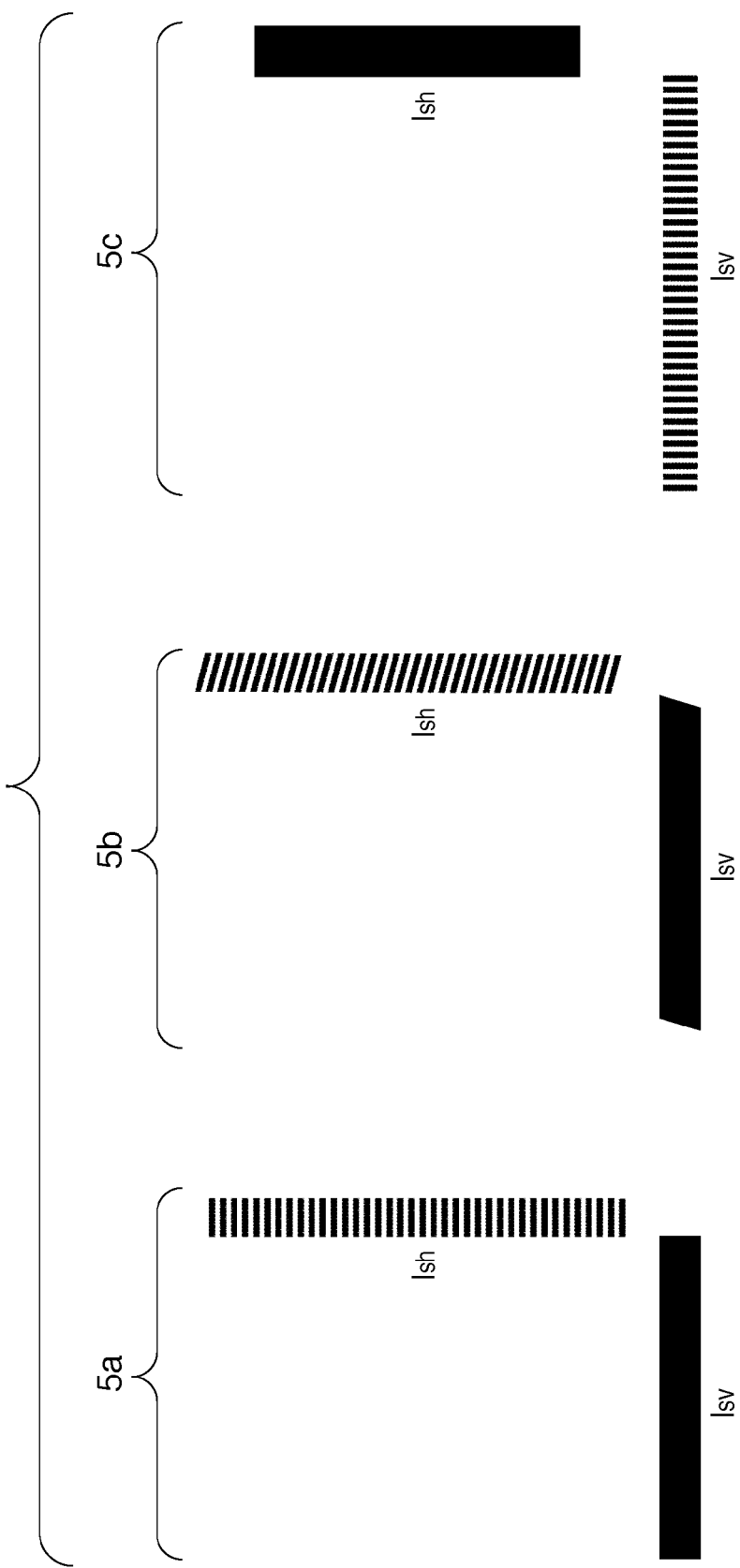
FIG. 5 is a view showing examples of reduced image data Ish obtained by reducing image data I in the horizontal direction and reduced image data Isv obtained by reducing the image data I in the vertical direction.

FIG. 5 is a view showing examples of the reduced image data Ish obtained by reducing the image data I in the horizontal direction and the reduced image data Isv obtained by reducing the image data I in the vertical direction. Note that reduced image data 5*a*, 5*b*, and 5*c* are generated based on the document images 4*a*, 4*b*, and 4*c*, respectively.

Reduced images are generated in both the horizontal and vertical directions to cope with input of the image data I tilted by 90°, as indicated by 4*c*. Such a situation often occurs upon reading using a scanner. Hence, if the input direction of the image data I is guaranteed in advance, the image data may be reduced in only one direction corresponding to the character string direction.

As is apparent from FIG. 5, in the reduced image obtained by reduction in the character string direction, a plurality of character strings are expressed as a plurality of clusters (objects) of significant pixels. Generation of the reduced image will be described below in more detail.

As a detailed calculation method usable for the reduction process of the image reduction unit 102, input image data can be reduced by simply thinning the pixels at a predetermined period. However, to more accurately discriminate between a character string portion and a line spacing portion, calculation using a bilinear method to be described below is preferably performed.

Figure 6:
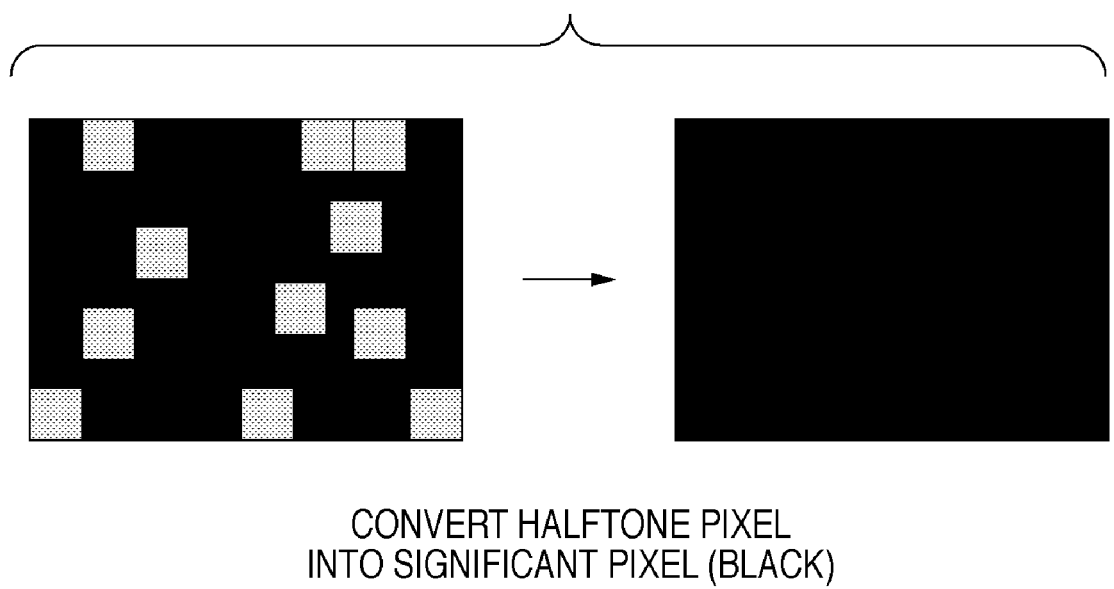
FIG. 6 is a view showing a state in which portions calculated as halftone are converted into black pixels that are significant pixels.

In the bilinear method, based on the pixel values of four pixels in close vicinity in the image data I, the pixel values of corresponding pixels in reduced image data are calculated. In this case, if at least one of the four pixels is black, the calculation result indicates halftone (gray) (left side of FIG. 6). More specifically, when the white pixel value is 0, and the black pixel value is 1, a value larger than 0 and smaller than 1 is obtained as the calculation result.

A line spacing portion has no black pixel that is a significant pixel. For this reason, if a portion having four pixels in close vicinity includes at least one black pixel, the portion can be estimated as a character string region. When a portion calculated as halftone is converted into a black pixel that is a significant pixel (right side of FIG. 6), the character string regions and line spacing regions can accurately be divided. That is, this method uses a fact that although a character string region does not always include a significant pixel (e.g., a character with a small number of strokes), a line spacing region generally has no significant pixel.

The reduction in the horizontal and vertical directions by the image reduction unit 102 is done at a reduction ratio that ensures a recognizable object size. The specific reduction ratio can be either designated as a fixed value in advance or determined as needed based on the additional data (e.g., the reading resolution information of the scanner) of the input image data. The bilinear method is applied as an example of the reduced image generation algorithm. However, the present invention is not limited to this. Reduction can be done using various calculation methods such as a nearest-neighbor method and a bicubic method.

In step S203, the character string detection unit 103 detects reduced objects corresponding to character strings from the reduced image data (Ish in this case) supplied from the image reduction unit 102. That is, the character string detection unit 103 detects only reduced objects corresponding to character string portions from the reduced image data of image data containing character strings, photo images, and graphics.

Figure 7:
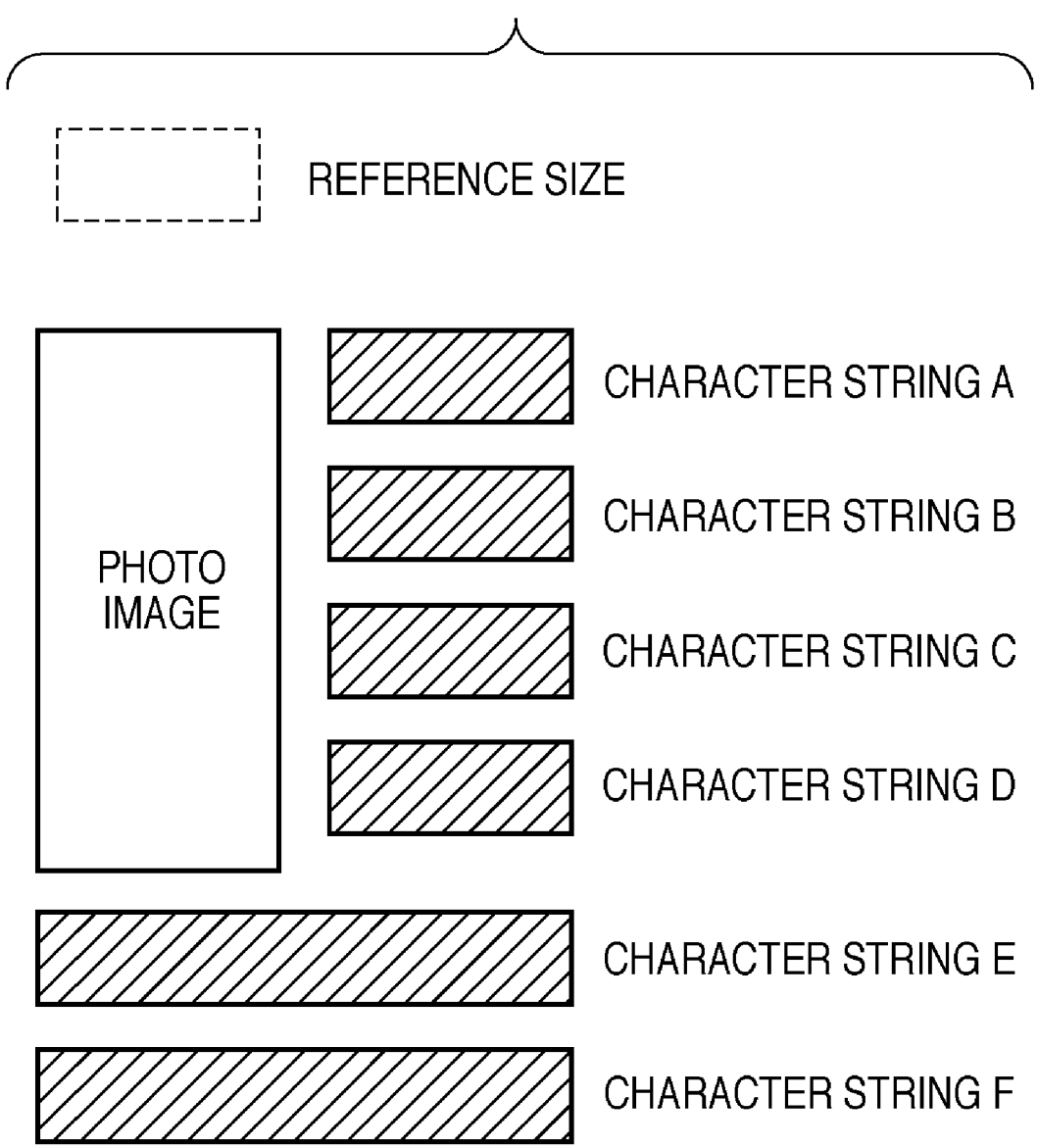
FIG. 7 is a view showing an example of the reduced image Ish of the image data.
Figure 8:
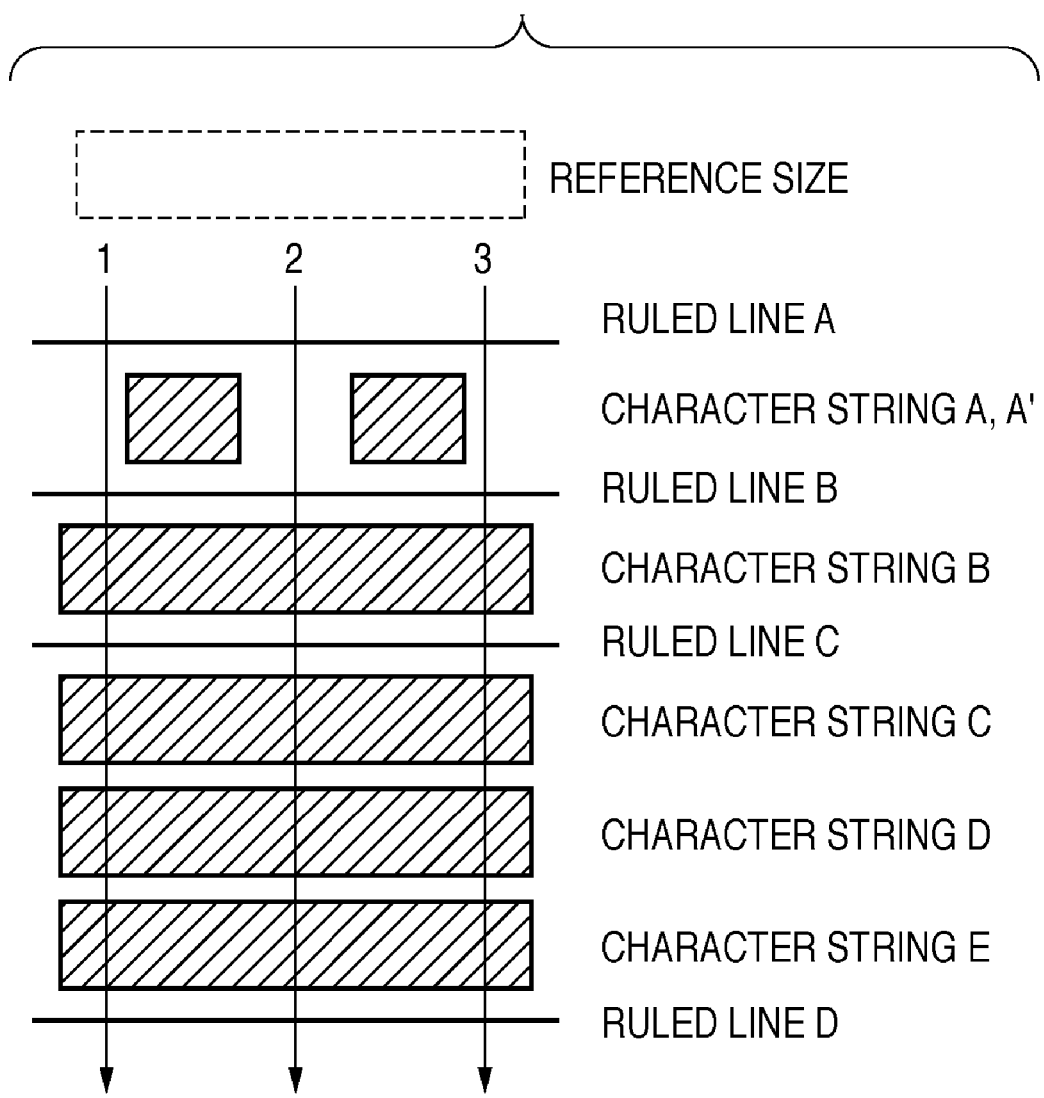
FIG. 8 is a view showing another example of the reduced image Ish of the image data.

FIGS. 7 and 8 are views showing examples of the reduced image Ish of the image data. A dotted rectangle on the upper side of each drawing indicates a reference size to determine a reduced object corresponding to a character string. The reference size is set in advance based on the width and height of a character string extractable on the extraction side. For example, Width (Wo) of reduced object>width (Ww) of reference size Height (Ho) of reduced object>height (Hw) of reference size When a reference size of the character string height is set, and a document image containing a photo image is input in step S201, the photo image portion can be excluded based on the height limitation. For example, the height of the photo image in FIG. 7 is more than the height of the reference size. Hence, the photo image is not extracted as a reduced object corresponding to a character string.

Setting a reference size of the character string width is preferable in extracting information by scanning a plurality of portions on the information extraction side (to be described later), as shown in FIG. 8. FIG. 8 shows an example in which the line spacing values between character strings are extracted by scanning three portions indicated by arrows 1 to 3 on the information extraction side. In this case, a width including the three scanning positions is set as the reference size. This makes it possible not to extract a reduced object corresponding to a character string which does not fall on a scanning position. Depending on the scanning position on the information extraction side, it is necessary to consider not only the width of the scanning reference size but also the position of the reference size.

In this way, the entire reduced image data is scanned using the window of the reference size, thereby detecting reduced objects corresponding to character strings from all reduced objects. As a result, in the example shown in FIG. 7, character strings A to F are detected as reduced objects corresponding to character strings. The photo image object is not detected as a reduced object corresponding to a character string. In the example shown in FIG. 8, character strings B to E are detected as reduced objects corresponding to character strings. Even character strings A and A' are reduced objects corresponding to character strings. However, they are not detected as reduced objects corresponding to character strings because the widths are smaller than the reference size.

Figure 16:
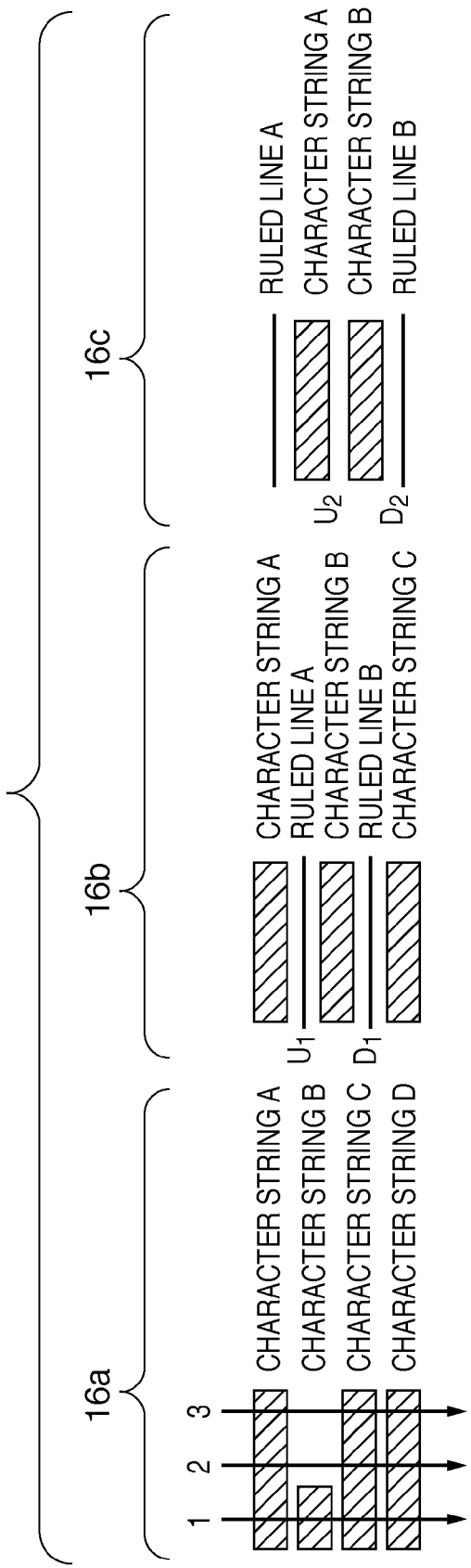
FIG. 16 is a view showing still another example of the reduced image Ish of the image data.

In an example 16a in FIG. 16, a character string B satisfies the width and position of the reference size, that is, falls on scanning position 1. For this reason, all the character strings A to D are detected as reduced objects corresponding to character strings.

In step S204, it is determined whether the reduced objects detected as reduced objects corresponding to character strings in step S203 include a reduced object which satisfies a preset prohibition condition. If such a reduced object exists, the process advances to step S205. Otherwise, the process advances to step S206. An example of the prohibition condition is "two or less character strings sandwiched between ruled lines". That is, when ruled lines are immovable, or a ruled line existing between character strings disables the extraction side from extracting a correct line spacing, the object is excluded from the target. This reduces extraction errors on the watermark information extraction side.

In, for example, the reduced image data shown in FIGS. 7 and 8, the prohibition condition "two or less character strings sandwiched between ruled lines" applies to the character string B in FIG. 8.

Another example of the prohibition condition is "distance between character strings". In a document including paragraphs spaced apart from each other, this condition prohibits information embedding using the line spacing value between the separated paragraphs and reduces extraction errors.

The following description will be made based on the first prohibition condition "two or less character strings sandwiched between ruled lines".

In step S205, reduced objects in which watermark information can be embedded are selected. More specifically, reduced objects that satisfy the prohibition condition are excluded from the reduced objects corresponding to character strings detected in step S203. In, e.g., FIG. 8, the character string B which satisfies the prohibition condition "two or less character strings sandwiched between ruled lines" is excluded. Hence, the remaining character strings C, D, and E are selected as usable reduced objects.

In step S206, the character coordinate data generation unit 104 derives coordinate data in the image data before reduction, which correspond to each reduced object selected in step S203 or S205. That is, the character coordinate data generation unit 104 derives the coordinate data using the coordinates of the objects in the reduced image data and the reduction ratio of the image reduction unit 102 in step S202.

In step S207, the character string specifying unit 105 specifies the character strings in the image data before reduction based on the image data before reduction and the coordinate data derived by the character coordinate data generation unit 104.

In step S208, the watermark embedding unit 106 moves the character strings specified in step S207 and embeds watermark information. More specifically, the watermark embedding unit 106 executes image processing of obtaining character string line spacings as shown in FIG. 3. To embed binary information "0", the relative positions of the plurality of character string objects are changed such that U>D holds. To embed "1", the relative positions of the plurality of character string objects are changed such that U<D holds.

In step S209, the image output unit 107 outputs the image data which has undergone the process in step S208 as electronic data or prints the image data on a paper sheet.

A method considering a prohibition condition has been described above. Without the prohibition condition, step S204 can be omitted.

For example, the following method does not require the above-described prohibition condition "two or less character strings sandwiched between ruled lines".

In an example 16b in FIG. 16, one character string exists between ruled lines. In this case, the ruled lines are neglected. Let U1 be the line spacing value between the character strings A and B, and D1 be the line spacing value between the character strings B and C.

To embed "0": U1>D1
To embed "1": U1<D1

This setting allows embedding information.

In an example 16c in FIG. 16, two character strings exist between ruled lines. In this case, let U2 be the line spacing value between the character strings A and B, and D2 be the line spacing value between the character string B and a ruled line B. This setting allows embedding information.

If measurement is done for the reduced image data Ish indicated by 5c in step S201, it is impossible to measure the distance between objects. Hence, it is impossible to extract a watermark image in step S203. This is because the image data I rotated by 90° is input in step S201, and therefore, the reduced image data Ish is generally a solid black image. In such a case, the same processes as in steps S203 to S208 are executed for the other reduced image data (Isv in this case) generated in step S202. In the above-described example, when the distance between objects cannot be measured using the reduced image data Ish, the reduced image data Isv (second reduced image data) is used. However, the order may be reversed.

<Arrangement of Information Extraction Apparatus>

Figure 9:
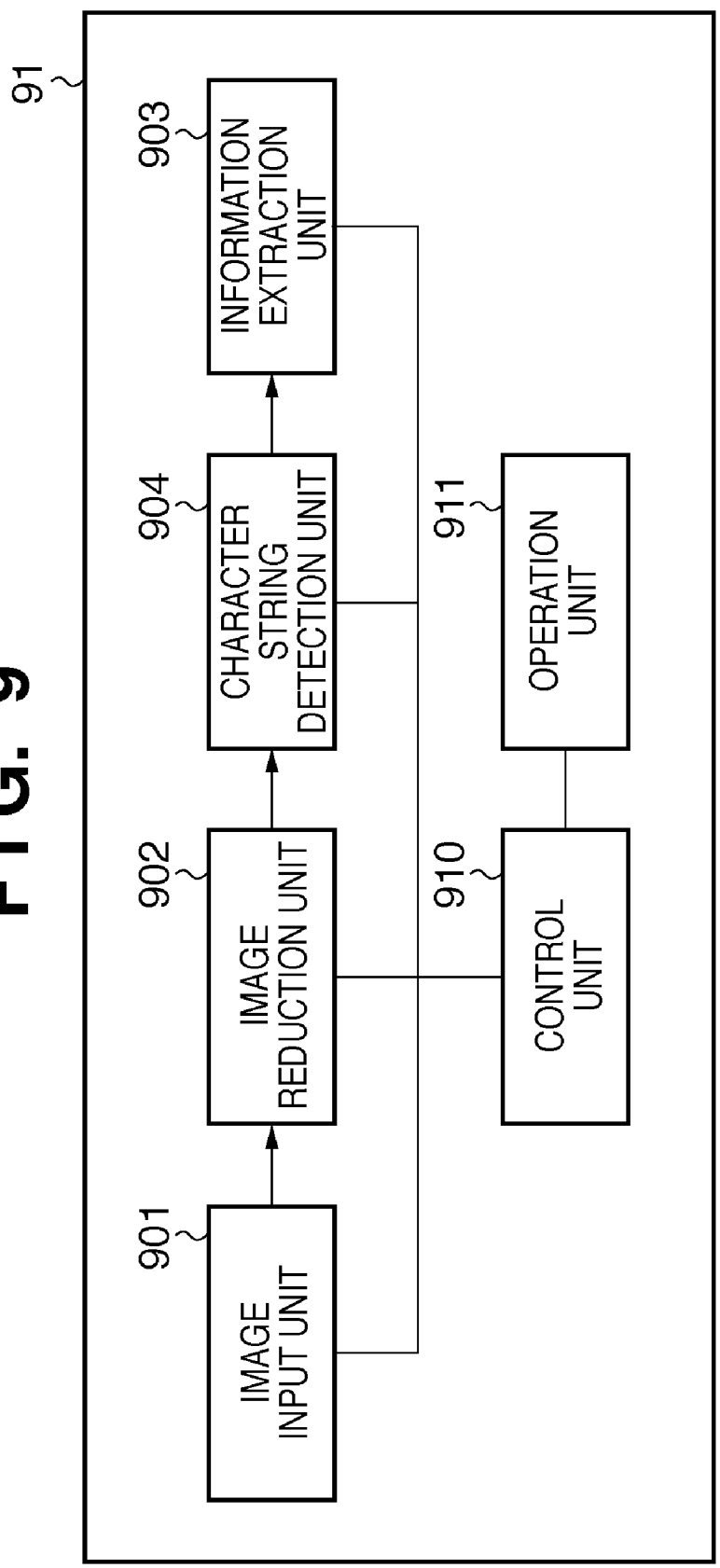
FIG. 9 is a block diagram showing the main functional arrangement of a watermark information extraction image processing apparatus 91 according to the first embodiment.

FIG. 9 is a block diagram showing the main functional arrangement of an information extraction image processing apparatus 91 according to the first embodiment. As shown in FIG. 9, the image processing apparatus 91 includes an image input unit 901, image reduction unit 902, information extraction unit 903, character string detection unit 904, control unit 910, and operation unit 911. If the image processing apparatus 91 is integrated with the above-described image processing apparatus serving as an image embedding apparatus, they may share functional units having the same names.

The image input unit 901 is a functional unit which inputs image data, like the above-described image input unit 101. However, the image input unit 901 inputs an image having embedded watermark information, unlike the above-described image input unit 101.

The image reduction unit 902 is a functional unit which reduces the image data input by the image input unit 901 in a first direction (e.g., the horizontal direction of the image) and in a second direction (e.g., the vertical direction of the image) perpendicular to the first direction, like the image reduction unit 902.

The character string detection unit 904 is a functional unit which detects a character string object from a mixed document image reduced by the image reduction unit 902. That is, the input reduced image contains character strings, photo images, and graphics. The character string detection unit 903 detects only the character string portions.

The information extraction unit 903 is a functional unit which extracts binary information corresponding to watermark information from the reduced image data generated by the image reduction unit 902. More specifically, the information extraction unit 903 extracts the information by detecting the presence/absence of a significant pixel from the reduced image data generated by the image reduction unit 902. A portion where a significant pixel is detected is determined as a character string region. A portion where no significant pixel is detected is determined as a line spacing portion. Based on a length (the number of continuous pixels) corresponding to each of a plurality of line spacings determined as line spacing portions, binary data (0 or 1) corresponding to each line spacing is determined. A watermark information embedding algorithm including the correspondence between a line spacing portion length and binary data and the amount of information (the number of bits) is set in the information extraction unit 903 in advance.

The control unit 910 is a functional unit which controls to make the above-described functional units cooperatively operate. The operation unit 911 is a functional unit which receives an instruction from a user.

<Operation of Information Extraction Apparatus>

An operation of causing the image processing apparatus 91 to extract watermark information from the image data I will be described below in detail with reference to a flowchart.

Figure 10:
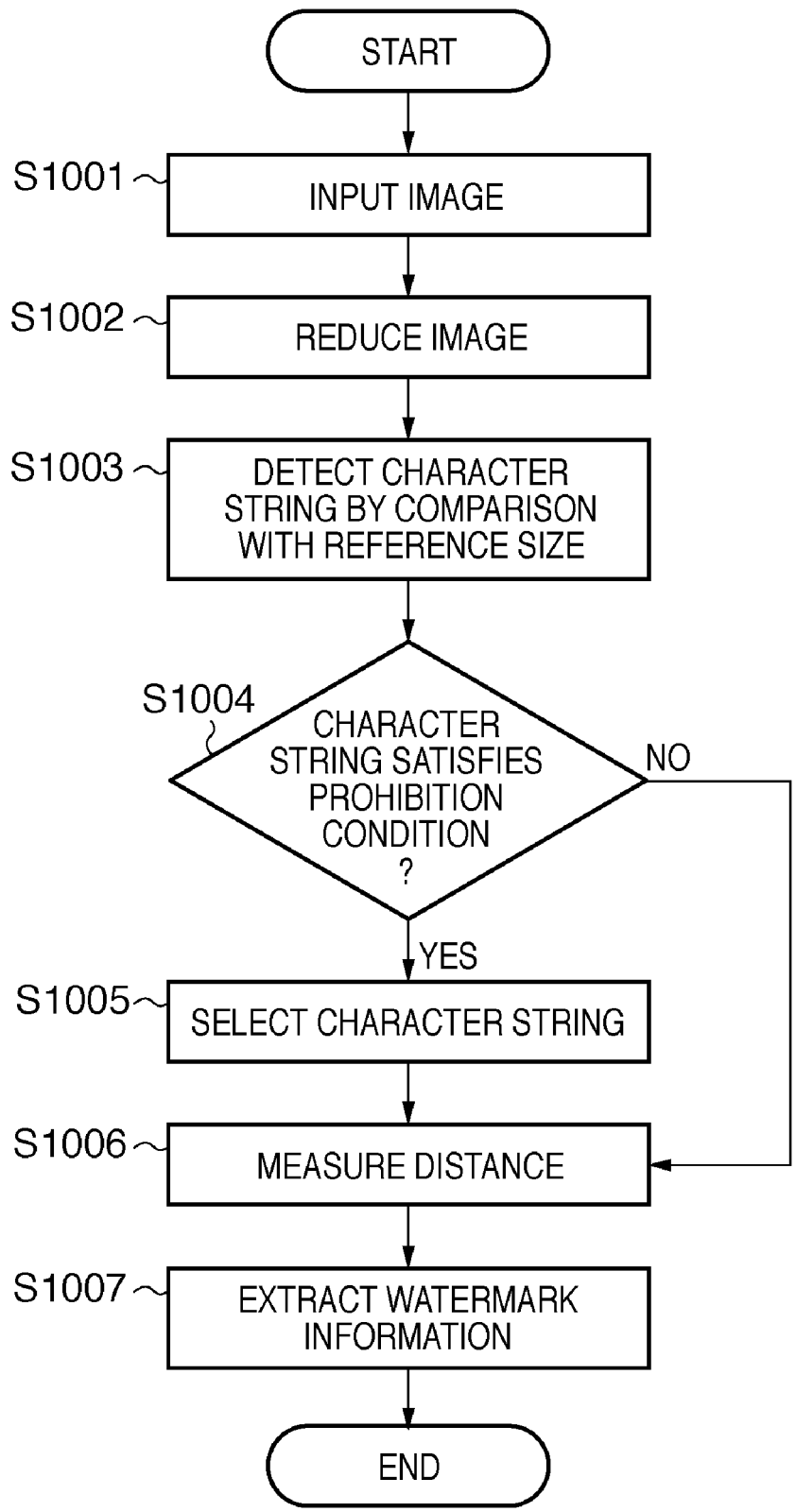
FIG. 10 is a flowchart illustrating the operation of the image processing apparatus 91.

FIG. 10 is a flowchart illustrating the operation of the image processing apparatus 91 according to the first embodiment. The following sequence is triggered by, for example, an image reading instruction input by the user via the operation unit 911.

In step S1001, the image input unit 901 receives, from a scanner, the image data I corresponding to a document image having watermark information and supplies the image data I to the image reduction unit 902.

In step S1002, the image reduction unit 902 reduces the image data I received from the image input unit 901 in the horizontal and vertical directions to generate the reduced image data Ish in the horizontal direction and the reduced image data Isv in the vertical direction. The image reduction unit 902 supplies the reduced image data Ish and Isv to the character string detection unit 904. Note that the reduced image data Ish and reduced image data Isv are the same as those in FIG. 4 described above in association with the embedding apparatus except that watermark information is embedded in the image data.

Reduced images are generated in both the horizontal and vertical directions to cope with input of the image data I tilted by 90°, as indicated by 4c, like the above-described embedding apparatus. Such a situation often occurs upon reading using a scanner. Hence, if the input direction of the image data I is guaranteed in advance, the image data may be reduced in only one direction corresponding to the character string direction. Details of the operation of the image reduction unit 902 are the same as in the image reduction unit 102, and a description thereof will not be repeated.

In step S1003, the character string detection unit 904 detects reduced objects corresponding to character strings from the reduced image data (Ish in this case) supplied from the image reduction unit 902. That is, the character string detection unit 904 detects only reduced objects corresponding to character string portions from the reduced image data of image data containing character strings, photo images, and graphics.

Like the above-described embedding apparatus, the character string detection unit 904 determines, as a character string, a reduced object that satisfies both of, for example, Width (Wo) of reduced object>width (Ww) of reference size Height (Ho) of reduced object>height (Hw) of reference size The entire reduced image data is scanned using the window of the reference size, thereby detecting reduced objects corresponding to character strings from all reduced objects. As a result, in the example shown in FIG. 7, character strings A to F are detected as reduced objects corresponding to character strings, like the above-described embedding apparatus. The photo image object is not detected as a reduced object corresponding to a character string. In the example shown in FIG. 8, character strings B to E are detected as reduced objects corresponding to character strings. Even character strings A and A' are reduced objects corresponding to character strings. However, they are not detected as reduced objects corresponding to character strings because the widths are smaller than the reference size.

In step S1004, it is determined whether the reduced objects detected as reduced objects corresponding to character strings in step S1003 include a reduced object which satisfies a preset prohibition condition. If such a reduced object exists, the process advances to step S1005. Otherwise, the process advances to step S1006. An example of the prohibition condition is "two or less character strings sandwiched between ruled lines", like the above-described embedding apparatus. That is, when ruled lines are immovable, or a ruled line existing between character strings disables the extraction side from extracting a correct line spacing, the object is excluded from the target. This reduces extraction errors.

In step S1005, reduced objects having embedded watermark information are selected. More specifically, reduced objects that satisfy the prohibition condition are excluded from the reduced objects corresponding to character strings detected in step S1003. In, for example, FIG. 8, the character string B which satisfies the prohibition condition "two or less character strings sandwiched between ruled lines" is excluded. Hence, the remaining character strings C, D, and E are selected as usable reduced objects.

In step S1006, the information extraction unit 903 measures the length (line spacing) between character string regions using one of the reduced image data supplied from the image reduction unit 902. The measurement is done for only the reduced objects selected in step S1005. In this case, the measurement is done for the reduced image data Ish reduced in the horizontal direction. The measurement method will be described below in detail.

Figure 11:
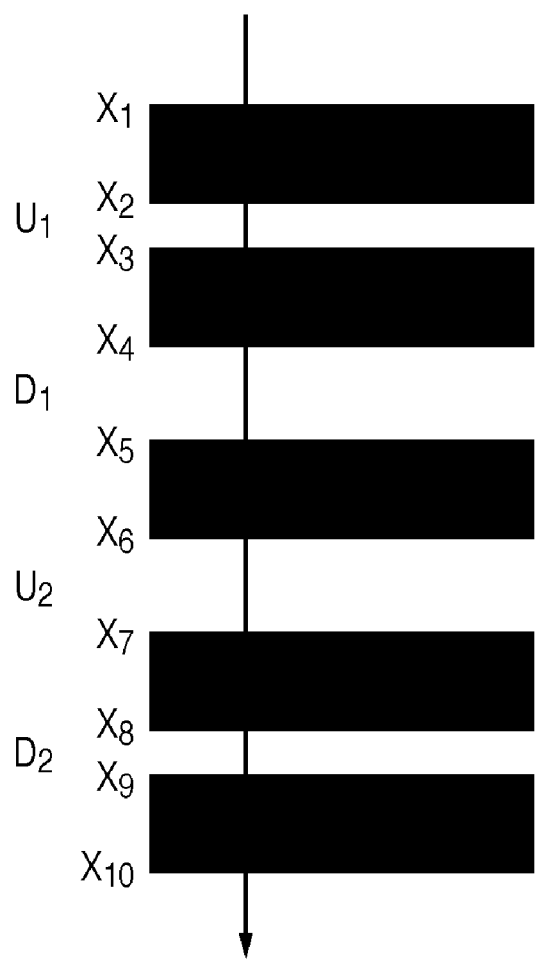
FIG. 11 is an enlarged view of the reduced image data Ish.

FIG. 11 is an enlarged view of the reduced image data Ish. First, the information extraction unit 903 detects the presence/absence of significant pixels by scanning the reduced image data Ish in a direction (vertical direction in this case) perpendicular to the reduction direction (horizontal direction in this case). A position where the presence/absence of a significant pixel is inverted is determined as the boundary between a character string region and a line spacing region.

For example, when inverting positions are detected along the arrow in FIG. 11, pixel positions $x_1$ to $x_{10}$ are detected. The lengths of line spacings $U_1$, $D_1$, $U_2$, and $D_2$ are given by $U_1=x_3-x_2$, $D_1=x_5-x_4$, $U_2=x_7-x_6$, and $D_2=x_9-x_8$, respectively (the unit is "pixel" (pix)).

As described above, upon the reduction process in step S1002, the character string regions are reduced in the character array direction, and simultaneously, the halftone portions are converted into significant pixels. This increases the density of significant pixels (black in this case) in each character string region. As a result, the information extraction unit 903 can more accurately detect the boundary between a character string region and a line spacing region and accurately measure each line spacing.

Figure 13:
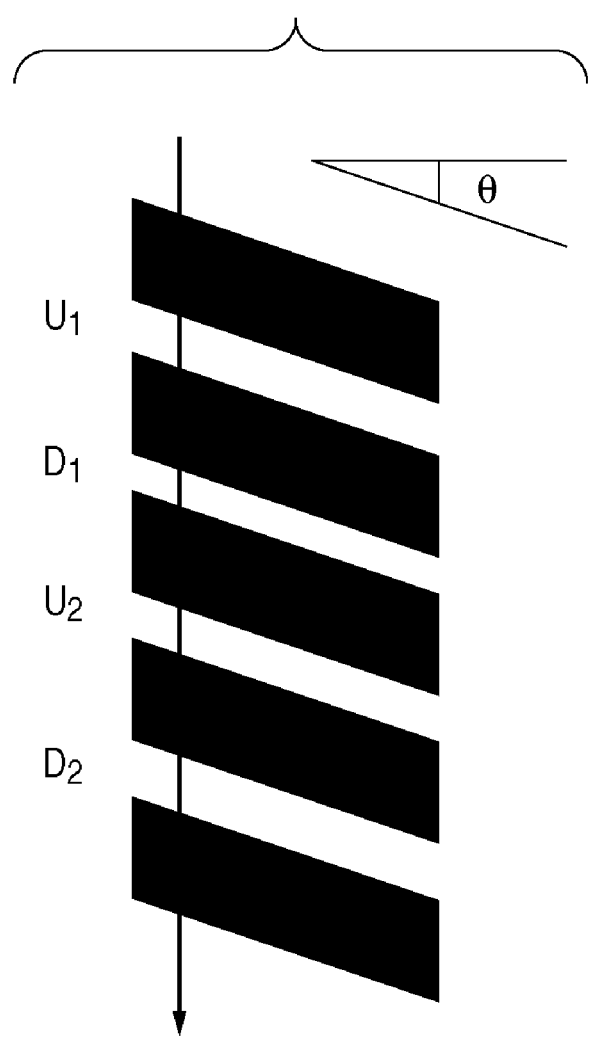
FIG. 13 is a view showing scanning of the reduced image data Ish indicated by 5b.
Figure 14:
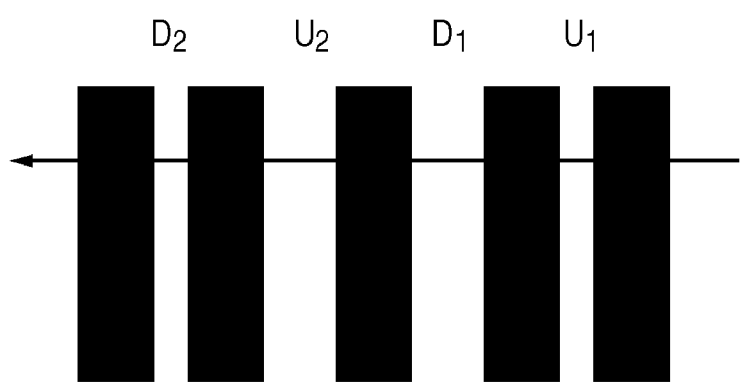
FIG. 14 is a view showing a state in which the reduced image data Isv is scanned in the horizontal direction.

The above-described method is effective even when the reduced image data Ish is slightly tilted, as indicated by 5b. FIG. 13 is a view showing scanning of the reduced image data Ish indicated by 5b. In this case, the length of each line spacing along the arrow is different from the result in FIG. 11. More specifically, when the tilt of a character string is θ (°), the length is 1/cos θ times. However, the relative relationship between the lengths of the line spacings does not change.

Figure 12:
FIG. 12 is a view showing a state in which the reduced image data Ish is scanned a plurality of number of times.

For the reduced image data obtained by the above-described bilinear method, generally, scanning needs to be performed only once. For more accurate detection, the reduced image is scanned a plurality of number of times, and an average value of the distances at a plurality of positions may be determined as a line spacing. The scanning at a plurality of positions is also effective for reduced image data generated by thinning. FIG. 12 is a view showing a state in which the reduced image data Ish is scanned at a plurality of positions. Referring to FIG. 12, a character string portion represented by a black object is closer to real reduced image data. That is, a character string region is represented not as an ideal rectangular object as shown in FIG. 11 but as an object including insignificant pixels (white pixels). This slightly changes the measurement value of the distance (line spacing) between objects depending on the scanning position.

Assume that the following values are obtained by scanning at three positions (arrows 1, 2, and 3), as shown in FIG. 12.
Arrow 1: $U_1$=10 [pix], $D_1$=4 [pix], $U_2$=4 [pix], $D_2$=12 [pix]
Arrow 2: $U_1$=8 [pix], $D_1$=5 [pix], $U_2$=6 [pix], $D_2$=10 [pix]
Arrow 3: $U_1$=6 [pix], $D_1$=3 [pix], $U_2$=5 [pix], $D_2$=8 [pix]
In this case, the average values of the lengths,
$U_1$=8 [pix], $D_1$=4 [pix], $U_2$=5 [pix], $D_2$=10 [pix]
are determined as the distances (line spacings) between the objects.

In step S1007, the information extraction unit 903 derives watermark information based on the line spacings derived in step S1006. More specifically, watermark information is calculated in correspondence with the embedding algorithm preset in the information extraction unit 903. For example, in FIG. 11, watermark information is derived as "10 (binary)" because $U_1<D_1$, and $U_2>D_2$.

However, if measurement is done for the reduced image data Ish indicated by 5c in step S1006, it is impossible to measure the distance between objects. Hence, it is impossible to extract a watermark image in step S1007. This is because the image data I rotated by 90° is input in step S1001, and therefore, the reduced image data Ish is generally a solid black image. In such a case, the same processes as in steps S1003 to S1007 are executed for the other reduced image data (Isv in this case) generated in step S1002. At this time, however, the reduced image data Isv (second reduced image data) is scanned in the horizontal direction. In the above-described example, when the distance between objects cannot be measured using the reduced image data Ish, the reduced image data Isv is used. However, the order may be reversed.

The image processing apparatus 91 extracts watermark information from the image data I in accordance with the above-described operation sequence.

Without the prohibition condition, step S1004 can be omitted, as described above in association with the information embedding apparatus.

In the above description, the document image data has one of the patterns shown in FIG. 4. That is, the document image data is input almost in the normal direction or input while being rotated by 90°. When the document image data is input while being inverted in the vertical or horizontal direction, scanning is also executed in directions reverse to the scanning directions shown in FIGS. 11 to 14. When such a situation is supposed to occur, an algorithm independent of the reading start direction is preferably used as the watermark information embedding algorithm.

For example, when "010 (binary)" or "11010 (binary)" is embedded using "0" as the start bit and "11" as the stop bit, "010111 (binary)" or "01101011 (binary)" is embedded. If "010111000101 (binary)" or "0110101100101001 (binary)" that enables reading from both sides is embedded, the information can be extracted by performing scanning only once from the upper side to the lower side. The bits of the second half of the information are inverted. This is because when the determination condition is
To embed "0": $U_n>D_n$
To embed "1": $U_n<D_n$
the order of $U_n$ and $D_n$ is reversed, and bit inversion occurs upon reading from the opposite side.

When both the start bit and the stop bit are "0", information "101 (binary)" is embedded as "001010 (binary)". The information is read from the opposite side as "101011 (binary)". That is, the start bit is "1". Hence, when the information portion is inverted to "010100 (binary)" and rearranged in the reverse direction, "001010 (binary)" can be extracted.

The first embodiment has been described using an algorithm of embedding watermark information in correspondence with the relative length of a set of (two) line spacings, as shown in FIG. 3. However, as described at the beginning, the present invention is not limited to the embedding algorithm. For example, an algorithm may be employed, which uses the first line spacing (between the first and second lines of character strings) as a reference, and embeds information by making the second line spacing (between the second and third lines of character strings) and the subsequent line spacings correspond to the relative length to the first line spacing. Not binary information based on the relative line spacing but information of more levels based on the line spacing may be embedded. This method is effective for any arbitrary embedding algorithm using the line spacing.

As described above, according to the image processing apparatus of the first embodiment, it is possible to embed or extract watermark information even when input image data includes an object other than character strings. Additionally, even when input image data has a tilt, information can be embedded or extracted without any cumbersome operation.

Second Embodiment

In the second embodiment, a form for executing watermark information embedding/extraction for a document image read by, for example, a scanner by a program that runs on a computer (PC) will be described.

<Device Arrangement>

Figure 15:
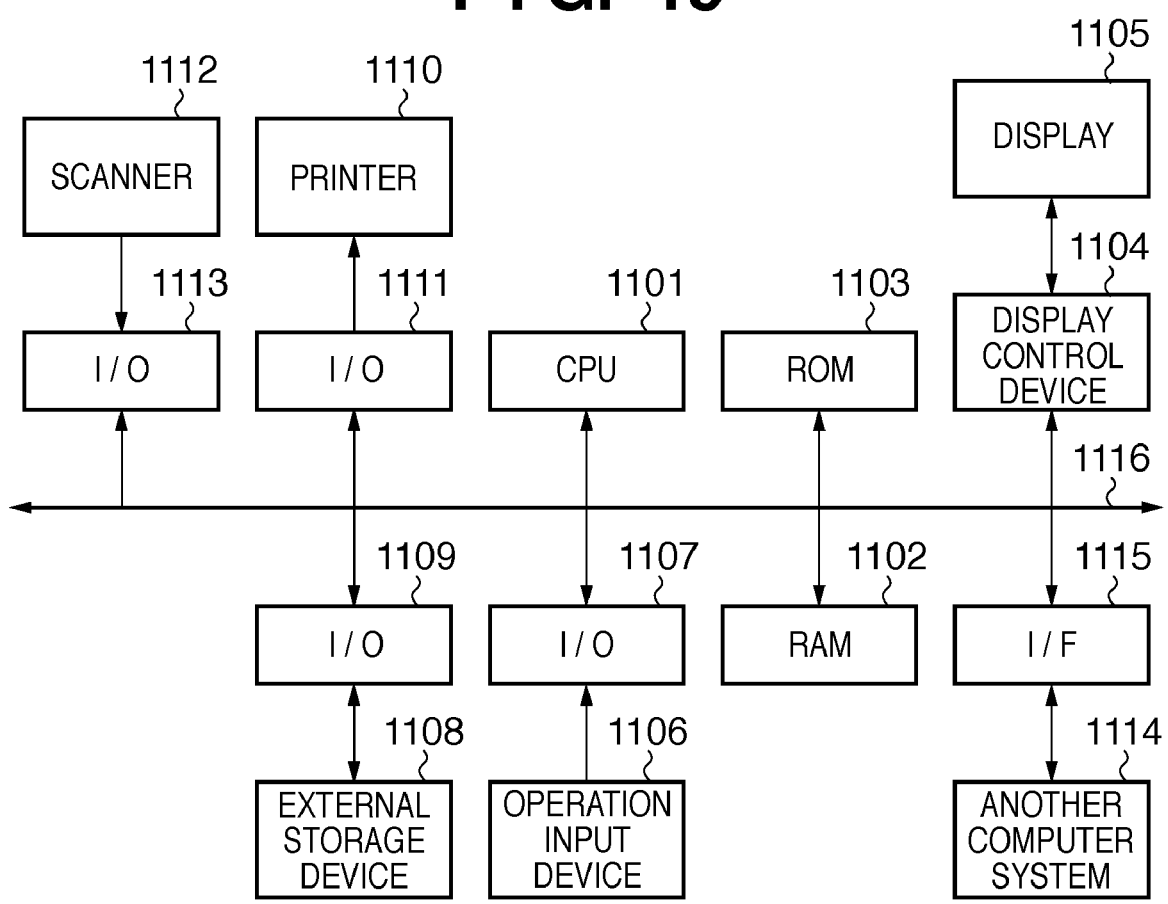
FIG. 15 is a block diagram showing the internal arrangement of a PC.

FIG. 15 is a block diagram showing the internal arrangement of a PC.

Referring to FIG. 15, a CPU 1101 implements the units of the functional blocks shown in, for example, FIG. 9 based on programs and data stored in a RAM 1102 or a ROM 1103.

The RAM 1102 stores programs and data loaded from an external storage device 1108. The RAM 1102 also temporarily stores programs and data downloaded from another computer system 1114 via an I/F (interface) 1115. The RAM 1102 also has an area necessary for the CPU 1101 to execute various kinds of processes.

The ROM 1103 stores the functional programs and setting data of the computer. A display control device 1104 executes a control process to display an image or a text on a display 1105. The display 1105 displays an image or a text. As the display, a CRT or a liquid crystal screen is applicable.

An operation input device 1106 includes a device such as a keyboard or a mouse capable of inputting various kinds of instructions to the CPU 1101. An I/O 1107 notifies the CPU 1101 of various kinds of instructions input via the operation input device 1106.

The external storage device 1108 functions as a mass information storage device such as a hard disk and stores an OS (Operation System), various kinds of application programs, and input/output document images. Information write in the external storage device 1108 and information read from the external storage device 1108 are done via an I/O 1109.

A printer 1110 outputs a document or an image. The output data is sent from the RAM 1102 or the external storage device 1108 via an I/O 1111. Examples of the printer for outputting a document or an image are an inkjet printer, laser beam printer, thermal transfer printer, and dot impact printer.

A scanner 1112 reads a document or an image. The input data is sent to the RAM 1102 or the external storage device 1108 via an I/O 1113.

A bus 1116 connects the CPU 1101, ROM 1103, RAM 1102, I/O 1111, I/O 1109, display control device 1104, I/F 1115, I/F 1107, and I/O 1113.

<Operation of Apparatus>

The external storage device 1108 stores, as an application program, an image processing program for implementing the functional units and operation sequence described in the first embodiment. The operation sequence described in the first embodiment starts based on an image processing program activation instruction which is input by a user via the operation input device 1106. A detailed operation is the same as that described in the first embodiment, and a description thereof will not be repeated.

Other Embodiments

The embodiments of the invention have been described above in detail. The present invention is applicable to a system including a plurality of devices or an apparatus including a single device.

The present invention is also achieved by supplying a program to implement the functions of the above-described embodiments to the system or apparatus directly or from a remote site and causing the system or apparatus to read out and execute the supplied program codes. Hence, the program codes themselves which are installed in a computer to implement the functional processing of the present invention are also incorporated in the technical scope of the invention.

In this case, the program can take any form such as an object code, a program to be executed by an interpreter, or script data to be supplied to the OS as long as the functions of the program are available.

Examples of a recording medium to supply the program are a Floppy® disk, hard disk, optical disk (CD or DVD), magnetooptical disk, magnetic tape, nonvolatile memory card, and ROM.

The functions of the above-described embodiments are implemented when the computer executes the readout program. The functions of the above-described embodiments are also implemented when, for example, the OS running on the computer partially or wholly executes actual processing based on the instructions of the program.

The program read out from the recording medium is written in the memory of a function expansion board inserted into the computer or a function expansion unit connected to the computer and executed. Then, the CPU of the function expansion board or function expansion unit partially or wholly executes actual processing, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-146098, filed May 31, 2007 and 2008-131870 filed May 20, 2008, which are hereby incorporated by reference herein in their entirety.

What is claimed is:

1. An image processing apparatus for inputting a document image and embedding watermark information by controlling a line spacing between character strings in the document image, comprising:

an image reading apparatus for inputting a document image as image data;

an image reduction unit for, where W0 is the number of pixels in a first direction of the input document image and H0 is the number of pixels in a second direction perpendicular to the first direction, generating, from the input image data, reduced image data whose number of pixels in the first direction is W1 (1<W1<W0) and whose number of pixels in the second direction is H2 (1<H2<H0), wherein the ratio W0/W1 is higher than the ratio H0/H2;

a determination unit for determining reduced objects corresponding to character strings in the image data by scanning the reduced image data generated by said image reduction unit in the second direction and comparing sizes of reduced objects in the reduced image data with a reference size designated in advance;

a specifying unit for specifying a position of each character string in the image data on the basis of positions of the reduced objects in the reduced image data, which are determined by said determination unit as the reduced objects corresponding to the character strings; and an embedding unit for embedding the watermark information in the image data by moving positions of a plurality of character strings in the image data, which are specified by said specifying unit, on the basis of a preset line spacing correspondence relationship.

2. The apparatus according to claim 1, wherein
the reference size is set as a rectangle whose number of pixels in the first direction is Ww (1<Ww<W0) and whose number of pixels in the second direction perpendicular to the first direction is Hw (1<Hw<H0), and
where Wo is the number of pixels in the first direction of a reduced object in the reduced image data and Ho is the number of pixels in the second direction, said determination unit determines a reduced object that satisfies Wo>Ww, and Ho<Hw as a reduced object corresponding to a character string in the image data.

3. The apparatus according to claim 1, wherein said specifying unit excludes, on the basis of a prohibition condition designated in advance, a reduced object which satisfies the prohibition condition from the reduced objects determined by said determination unit as the reduced objects corresponding to the character strings and specifies the positions of the character strings in the image data.

4. The apparatus according to claim 1, wherein
said image reduction unit further generates, from the image data, second reduced image data whose number of pixels at least in the second direction is H1 (1<H1<H0),
when said determination unit has detected no reduced object corresponding to a character string in the image data, said determination unit further determines reduced objects corresponding to character strings in the image data by scanning the second reduced image data and comparing sizes of reduced objects in the second reduced image data with the reference size designated in advance,
said specifying unit specifies a position of each character string in the image data on the basis of positions of the reduced objects in the second reduced image data, which are determined as the reduced objects corresponding to the character strings, and
said embedding unit embeds the watermark information in the image data by moving positions of a plurality of specified character strings in the image data on the basis of the preset line spacing correspondence relationship.

5. An image processing apparatus for inputting a document image and extracting embedded watermark information from a line spacing between character strings in the document image, comprising:
an image reading apparatus for inputting a document image as image data;
an image reduction unit for, where W0 is the number of pixels in a first direction of the input document image and H0 is the number of pixels in a second direction perpendicular to the first direction, generating, from the input image data, reduced image data whose number of pixels in the first direction is W1 (1<W1<W0) and whose number of pixels in the second direction is H2 (1<H2<H0), wherein the ratio W0/W1 is higher than the ratio H0/H2;
a determination unit for determining reduced objects corresponding to character strings in the image data by scanning the reduced image data generated by said image reduction unit in the second direction and comparing sizes of reduced objects in the reduced image data with a reference size designated in advance; and
a watermark information extraction unit for extracting the watermark information by scanning the reduced image data in the second direction and detecting a line spacing between the character strings of the reduced objects which are determined by said determination unit as the reduced objects corresponding to the character strings.

6. The apparatus according to claim 5, wherein
the reference size is set as a rectangle whose number of pixels in the first direction is Ww (1<Ww<W0) and whose number of pixels in the second direction is Hw (1<Hw<H0), and
where Wo is the number of pixels in the first direction of a reduced object in the reduced image data and Ho is the number of pixels in the second direction, said determination unit determines a reduced object that satisfies Wo>Ww, and Ho<Hw as a reduced object corresponding to a character string in the image data.

7. The apparatus according to claim 5, wherein said determination unit excludes, on the basis of comparison with the reference size, a reduced object which satisfies prohibition condition designated in advance from the reduced objects determined as the reduced objects corresponding to the character strings and decides the reduced objects corresponding to the character strings.

8. A method of controlling an image processing apparatus for inputting a document image and embedding watermark information by controlling a line spacing between character strings in the document image, comprising the steps of:
inputting a document image as image data;
where W0 is the number of pixels in a first direction of the input document image and H0 is the number of pixels in a second direction, generating, from the input image data, reduced image data whose number of pixels in the first direction is W1 (1<W1<W0) and whose number of pixels in the second direction is H2 (1<H2<H0), wherein the ratio W0/W1 is higher than the ratio H0/H2;
determining reduced objects corresponding to character strings in the image data by scanning the reduced image data generated in the image reducing step in the second direction and comparing sizes of reduced objects in the reduced image data with a reference size designated in advance;
specifying a position of each character string in the image data on the basis of positions of the reduced objects in the reduced image data, which are determined in the determining step as reduced objects corresponding to character strings; and
embedding the watermark information in the image data by moving positions of a plurality of character strings in the image data, which are specified in the specifying step, on the basis of a preset line spacing correspondence relationship.

9. A method of controlling an image processing apparatus for inputting a document image and extracting embedded watermark information from a line spacing between character strings in the document image, comprising the steps of:
inputting a document image as image data;
where W0 is the number of pixels in a first direction of the input document image and H0 is the number of pixels in a second direction perpendicular to the first direction, generating, from the input image data, reduced image data whose number of pixels in the first direction is W1 (1<W1<W0) and whose number of pixels in the second direction is H2 (1<H2<H0), wherein the ratio W0/W1 is higher than the ratio H0/H2;
determining reduced objects corresponding to character strings in the image data by scanning the reduced image data generated in the image reducing step in the second direction and comparing sizes of reduced objects in the reduced image data with a reference size designated in advance; and
extracting the watermark information by scanning the reduced image data in the second direction and detecting a line spacing between the character strings of the reduced objects which are determined in the determining step as the reduced objects corresponding to the character strings.

10. A computer program, which is stored in a non-transitory computer-readable storage medium, and causes a computer to execute the steps of an image processing apparatus control method of controlling an image processing apparatus for inputting a document image and embedding watermark information by controlling a line spacing between character strings in the document image, comprising the steps of:
inputting a document image as image data
where W0 is the number of pixels in a first direction of the input document image and H0 is the number of pixels in a second direction, generating, from the input image data, reduced image data whose number of pixels in the first direction is W1 (1<W1<W0) and whose number of pixels in the second direction is H2 (1<H2<H0), wherein the ratio W0/W1 is higher than the ratio H0/H2;
determining reduced objects corresponding to character strings in the image data by scanning the reduced image data generated in the image reducing step in the second direction and comparing sizes of reduced objects in the reduced image data with a reference size designated in advance;
specifying a position of each character string in the image data on the basis of positions of the reduced objects in the reduced image data, which are determined in the determining step as reduced objects corresponding to character strings; and
embedding the watermark information in the image data by moving positions of a plurality of character strings in the image data, which are specified in the specifying step, on the basis of a preset line spacing correspondence relationship.

* * * * *